United States Patent
Kwa et al.

(10) Patent No.: US 8,312,304 B2
(45) Date of Patent: *Nov. 13, 2012

(54) PLATFORM COMMUNICATION PROTOCOL

(75) Inventors: Seh W. Kwa, San Jose, CA (US); Neil Songer, Santa Clara, CA (US); Jim Kardach, Saratoga, CA (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/916,744

(22) Filed: Nov. 1, 2010

(65) Prior Publication Data

US 2011/0047395 A1 Feb. 24, 2011

Related U.S. Application Data

(63) Continuation of application No. 11/729,212, filed on Mar. 28, 2007, now Pat. No. 7,831,849.

(51) Int. Cl.
*G06F 1/00* (2006.01)
*G06F 3/00* (2006.01)
*H05K 7/10* (2006.01)
(52) U.S. Cl. ............................ 713/310; 710/8; 710/302
(58) Field of Classification Search ............... 713/310
See application file for complete search history.

(56) References Cited

U.S. PATENT DOCUMENTS

| | | | |
|---|---|---|---|
| 6,012,103 A | 1/2000 | Sartore et al. | |
| 6,425,093 B1 | 7/2002 | Singh et al. | |
| 6,460,106 B1 | 10/2002 | Stufflebeam | |
| 6,738,068 B2 | 5/2004 | Cohen et al. | |
| 6,851,068 B2 | 2/2005 | Jochiong et al. | |
| 6,973,603 B2 * | 12/2005 | Salmon et al. | 714/709 |
| 7,051,218 B1 | 5/2006 | Gulick et al. | |
| 7,086,583 B2 | 8/2006 | Wurzburg | |
| 7,207,014 B2 | 4/2007 | Velasco et al. | |
| 7,219,240 B2 | 5/2007 | O | |
| 7,613,938 B2 * | 11/2009 | Doyon et al. | 713/300 |
| 2005/0160196 A1 | 7/2005 | Dutton et al. | |

OTHER PUBLICATIONS

"Universal Serial Bus Specification," Compaq Computer Corporation et al., Apr. 27, 2000 (6 pages).
Fleming. Kris Power Saving of Using USB Selective Suspend Support Whitepaper. May 20, 2003 Intel Mobile Platforms Group (8 pages).

* cited by examiner

*Primary Examiner* — Suresh Suryawanshi
(74) *Attorney, Agent, or Firm* — Trop, Pruner & Hu, P.C.

(57) ABSTRACT

A host chipset heartbeat may be utilized, in some embodiments, to handle interrupts from external devices on a power efficient basis. The availability of the host chipset heartbeat may be signaled to external devices and those external devices may time their activities to a period of time when not only are resources available, but the assertion of the activity is advantageous because the host chipset is already transitioning from a lower power consumption state.

10 Claims, 1 Drawing Sheet

PLATFORM COMMUNICATION PROTOCOL

CROSS-REFERENCE TO RELATED APPLICATIONS

This application is a continuation of U.S. patent application Ser. No. 11/729,212, filed on Mar. 28, 2007 now U.S. Pat. No. 7,831,849.

BACKGROUND

This relates to communications between external devices and a platform.

Conventionally, external devices communicate with a platform by posing interrupts, events, and notifications to the platform. These interrupts can come at any time and have no regard for what activity is currently being undertaken on the platform.

Ideally, the platform may enter idle states to reduce power consumption. When the processor is in a reduced power consumption state and an interrupt comes in from an external device, the interrupt may cause the platform to power up to handle the interrupt. As a result, in many cases, it is difficult for the platform to minimize its power consumption because it has no effective control over the timing of the interrupts that arrive from external devices.

DETAILED DESCRIPTION

Figure 1:
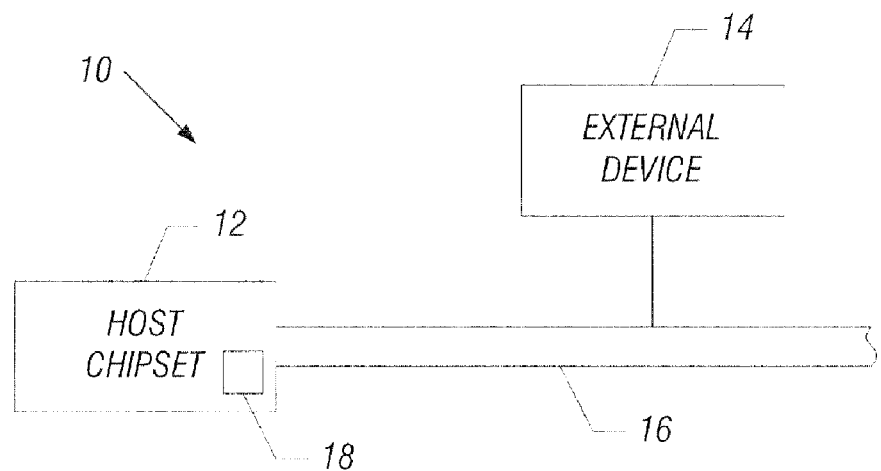
FIG. 1 is a schematic depiction of one embodiment of the present invention.

Platform power consumption may be reduced when activity within the system that includes both the platform and its external devices is aligned. As a result, the time that the system is idle may be increased which, in turn, allows better use of reduced power consumption states.

Generally, a system-wide clock is not visible to each source of activity. In other words, the system may include a number of external devices which are not synchronized with respect to communicating with the platform itself. In some embodiments, a synchronization mechanism that is system-wide may be provided by overlying existing sideband signaling. In one embodiment, by extending an existing sideband signal used for devices to wake a sleeping system, external devices may be notified when opportunities exist to align their interrupts and traffic cycles to a time period when system resources are available. In addition to sideband signals, other signaling mechanisms may be used as well, including, for example, system management bus or simple serial transport (SST) approaches.

When such alignment is not undertaken, the external devices tend to assume bus mastering capabilities with an asynchronous interrupt generation or traffic cycle initiation. As a result, the platform would conventionally need to be designed to be ready for activities at any time, making platform power management less successful.

Generally, platform events follow an established timing, particularly when the platform is idle. An operating system timer tick is a form of scheduling reminder for the system microprocessor. Upon an interrupt that represents that scheduling reminder, the microprocessor conducts its workload in an active window and then enters a low power consumption state as it becomes idle. In one case, the interrupt may be IRQ0/8. The active window may be typically short, on the order of a few hundred microseconds, for a typical idle system. In contrast, the operating system timer tick may have a significantly longer periodicity. For example, Microsoft Windows® operating system has a current periodicity of 15.6 milliseconds. While that periodicity represents a significant idle period, there are also small time windows where some basic functions depend on system resource availability to make progress. An example is the support of display refresh in an idle system using a partial frame buffer.

These small time windows of system resource (such as system memory) availability, marked by synchronization signals, are known as heartbeats. Heartbeats are not necessarily periodic or static. The interval between heartbeats depends on the functionality, as well as the internal buffering resource on the platform. Since system resources, as well as the platforms themselves, are active during the heartbeats, interrupts and traffic cycles from external devices may be aligned in these heartbeat time windows. This may result in increasing the deterministic idle times on the platform and increasing power management opportunities.

To implement such synchronization, a broadcast mechanism may be used that may include global sideband signaling or messages through a system management bus. Use of sideband signaling is desirable, in some embodiments, because, otherwise, conventional signaling would defeat the intent if the primary interconnect or bus between the chipset and the device were prohibited to enter low power modes. In the following discussion, an example of shared sideband signal, available through PCI Express, to support the synchronization communication is provided, but the present invention is in no way limited to this specific example. See the PCI Express Base 2.0 Specification, Jan. 15, 2007, available from PCI-SIG, 3855 SW 153$^{rd}$ Drive, Beaverton, Oreg. 97006.

The use of a sideband WAKE# signal is further enhanced to provide the host chipset the ability to communicate the opportunity to synchronize traffic activities. The goal of this synchronization is to reduce platform power consumption by encouraging all system resources to perform direct memory access and microprocessor interaction activities in a common time window, such that the idle time between such activities is gathered together, allowing the use of lower power consumption states during this lengthened and more deterministic idle period.

In accordance with the PCI Express specification, an external device asserts WAKE# with the bus in the L2 state. As a result of the contact from the external device, the bus transitions to the L0 state after a period of time. In response, the chipset asserts a WAKE# signal and enters the L0 state from either the L0 or L1 state. The time for assertion of the WAKE# signal may be 10 nanoseconds to 50 microseconds, in some embodiments. The period of assertion of the WAKE# signal for the external device may be on the order of a microsecond in order to increase the time window for traffic alignment.

Referring to FIG. 1, a host chipset 12 in a system 10 may be coupled by a bus 16 to an external device 14. The external device 14 may be any of the external devices conventionally found in computer systems, including a storage device, a display, an input/output (I/O) device, and a network card, to mention a few examples.

The host chipset 12 may assert the sideband WAKE# signal when the link is in the L0s or L1 state. Since the sideband WAKE# signal is a shared signal, it is possible for its assertion to occur when some links are in the L0s or L1 state, while others are in the L2 state.

When an external device 14 asserts the sideband WAKE# signal, the host chipset 12 follows a standard wakeup sequence from the L2 state without change from the conventional PCI Express behavior. When the host chipset only asserts the sideband WAKE# signal, the host chipset 12 waits for the external device 14 to initiate a link training signaling exit from L0s or L1 and then initiates traffic. The external device 14 initiates link training if traffic is desirable and, otherwise, remains in the L0s, L1, or L2 state.

If the host chipset asserts the WAKE# signaling, followed by external device assertion, the host chipset and the external device use standard wakeup sequencing from the L2 state without change from conventional behavior. Other external devices with link states in the L0s or L1 states may observe those sideband WAKE# assertion as a hint to align their traffic when another device is waking up the system resource.

If the external device asserts the WAKE# signal, followed by the host chipset assertion, the host chipset avoids the sideband WAKE# assertion if it detected the assertion of a sideband WAKE# signal. The external device asserting the WAKE# signal continues the exit from the L2 state. Other external devices in L0s and L1 states may choose opportunistically to align their low power link state exit to initiate traffic.

In some embodiments, a notification is provided to external devices about the availability of system resources, as well as an internal resource. This affords external devices an opportunity to align their interrupts or traffic cycles when the resources become available, reducing the need to disturb the system resources and increasing power conservation.

In some embodiments, synchronization hints may be provided to external devices such that they can become well behaved in aligning their interrupt communication and traffic cycles with host chipset resource availability. Doing so affords greater power management opportunities.

Historically, the WAKE# signaling on a PCI Express link is a mechanism to support device signaling when desired to exit from deep system or device low power states. Through the use of the same mechanism to alert the device to the opportunity to align interrupt traffic cycles, a non-deep system or device low power system power conservation advantages may be achieved without significant additional overhead.

Figure 2:
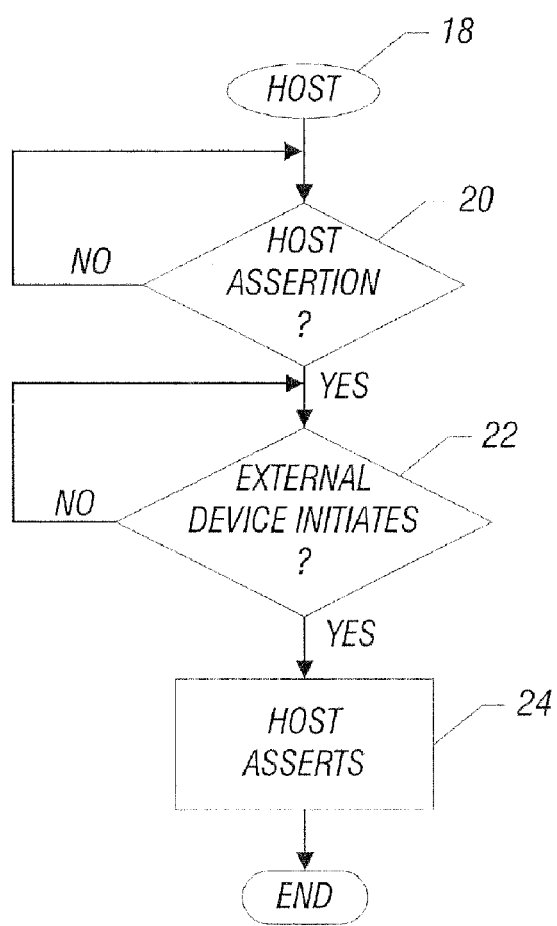
FIG. 2 is a sequence that may be utilized by the embodiment shown in FIG. 1 to handle communications from external devices.

Referring to FIG. 2, sequence 18 may be stored on the host chipset 12 or in connection with other components. In some embodiments, the sequence 18 may be implemented in hardware, software, or firmware. In the case of a software implementation, a computer readable medium, such as a semiconductor memory, may be used to store the software. The computer readable medium may store instructions that, when executed, perform the sequences illustrated in FIG. 2.

Initially, the host software 18 checks for host WAKE# signaling assertion at diamond 20. If there is such an assertion, a check at diamond 22 determines whether an external device initiates WAKE# signaling. If so, the host asserts the WAKE# signaling (block 24) and the sequence proceeds as described above. Namely, if the external device is the only one that asserts the WAKE# signaling, both the external device and the host chipset sequence from the L2 state without change from conventional operation. When the host chipset alone asserts the WAKE# signaling, the host chipset waits for the external device to initiate link training, signaling the exit from L0s or L1 and then initiates traffic. The external device initiates link training if traffic is desirable and, otherwise, remains in the L0s, L1, or L2 states. In the case where a host chipset assertion is followed by external device assertion, the standard wakeup sequence may be utilized. Similarly, with external device assertion, followed by host chipset assertion, the host chipset avoids sideband WAKE# signal assertion if it detected the assertion of the sideband WAKE# signal. The external device asserts the sideband WAKE# signal and continues its exit from the L2 state.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer readable medium storing instructions to enable a computer to:
provide a signaling mechanism to enable external devices to time their interaction with a system component to an interval of system resource availability determined by an operating system.

2. The medium of claim 1 further storing instructions to assert a WAKE# signaling to enable external devices to time their interaction with a system component including a host chipset.

3. The medium of claim 1 further storing instructions to assert, via a host chipset, a sideband signal to indicate to external devices to initiate link training.

4. The medium of claim 3 further storing instructions to cause said host chipset to assert a WAKE# sideband signal.

5. The medium of claim 4 further storing instructions to wait for an external device to initiate link training and then initiating traffic with said external device.

6. A system comprising:
a host chipset;
an external device coupled to said host chipset; and
said host chipset to initiate a sideband signal to enable the external device to time its interaction with the host chipset to an interval of system resource availability determined by an operating system.

7. The system of claim 6 wherein said host chipset to initiate a sideband signal in the form of a WAKE# signal to enable external devices to time their interaction with the host chipset.

8. The system of claim 6 wherein said host chipset to assert a sideband signal to indicate to external devices to initiate link training.

9. The system of claim 8 wherein said host chipset to assert a sideband signal in the form of a WAKE# sideband signal.

10. The system of claim 8, said host chipset to wait for an external device to initiate link training and then initiate traffic with said external device.

* * * * *